United States Patent [19]
Kleinschmidt

[11] Patent Number: 5,857,718
[45] Date of Patent: Jan. 12, 1999

[54] ARRANGEMENT FOR CONNECTING A METAL PIPE TO A RECEIVING SLEEVE

[75] Inventor: Jürgen Kleinschmidt, Beverungen, Germany

[73] Assignee: Benteler AG, Paderborn, Germany

[21] Appl. No.: 737,397

[22] PCT Filed: May 10, 1996

[86] PCT No.: PCT/DE96/00811

§ 371 Date: Nov. 8, 1996

§ 102(e) Date: Nov. 8, 1996

[87] PCT Pub. No.: WO96/35901

PCT Pub. Date: Nov. 14, 1996

[30]  Foreign Application Priority Data

May 11, 1995 [DE] Germany ............. 95 107 186.9

[51] Int. Cl.⁶ ............................................. F16L 37/12
[52] U.S. Cl. ............................... 285/305; 285/319
[58] Field of Search ........................... 285/305, 239, 285/330, 914, 913, 319, 39

[56]  References Cited

U.S. PATENT DOCUMENTS

| | | | |
|---|---|---|---|
| 922,805 | 5/1909 | Nelson et al. ............. | 285/305 X |
| 3,534,988 | 10/1970 | Lindsey ..................... | 285/305 |
| 4,059,295 | 11/1977 | Helm ......................... | 285/305 |
| 4,453,747 | 6/1984 | Bimba ........................ | 285/305 |
| 5,350,203 | 9/1994 | McNaughton et al. ..... | 285/319 |
| 5,367,548 | 11/1994 | Attix .......................... | 285/319 X |
| 5,496,073 | 3/1996 | Grenier ...................... | 285/39 |

FOREIGN PATENT DOCUMENTS

| | | | |
|---|---|---|---|
| 0444304 | 9/1991 | European Pat. Off. . | |
| 0 488 844 A1 | 6/1992 | European Pat. Off. .... | 285/305 |
| 1204894 | 11/1965 | Germany . | |
| 3440753 | 5/1986 | Germany . | |
| 2 263 956 | 8/1993 | United Kingdom ...... | 285/305 |

*Primary Examiner*—Eric K. Nicholson
*Assistant Examiner*—Greg Binda
*Attorney, Agent, or Firm*—Friedrich Kueffner

[57]  ABSTRACT

An arrangement for tightly connecting a metal pipe to a receiving sleeve includes a plug-in sleeve of metal fastened on the metal pipe, wherein the plug-in sleeve has radial projections engaging in two diametrically oppositely located grooves of the receiving sleeve, wherein the grooves terminate at the end face of the receiving sleeve. A U-shaped clamp is inserted in tangential slots of the receiving sleeve and the plug-in sleeve for coupling the sleeves to each other detachably but rigidly against pulling and pushing forces. The plug-in sleeve has a cylindrical fixing portion, a cylindrical coupling portion with greater inner and outer diameter than the fixing portion, and a conically-shaped transition portion integrally connecting the transition portion and the coupling portion. The radial projections are substantially axially oriented tongues cut out of the coupling portion and extending at an angle relative to the coupling portion.

7 Claims, 3 Drawing Sheets

ARRANGEMENT FOR CONNECTING A METAL PIPE TO A RECEIVING SLEEVE

BACKGROUND OF THE INVENTION

1. Field of the Invention

The invention is directed to an arrangement for the tight connection of a metal pipe to a receiving sleeve.

2. Description of the Preferred Embodiments

In many areas of technology, it is necessary to effect a fast, detachable and tight connection of a metal pipe, especially a metal pipe of small nominal dimensions, to a receiving sleeve which forms a component part of a stationary or movable unit, e.g., a housing, or which is fastened by its end to a line, in particular to a hose.

Previously, a one-piece plastic sleeve was used to connect a metal pipe of this type with a receiving sleeve, this plastic sleeve being tightly locked with the receiving sleeve. For this purpose, the plastic sleeve is glued to the metal pipe. In this arrangement of the end of the metal pipe, the use of different materials (metal, plastic) as well as the fact that the plastic sleeve is glued to the metal pipe is disadvantageous. This brings about substantial problems with respect to disposal and recycling. Furthermore, the gluing requires special drying times and curing times, especially when the connection is to be made in the area of high operating temperatures, e.g., between 100° C. and 150° C. This is the case, for instance, in the cooling system of a motor vehicle. Furthermore the majority of glues available for fixing plastic sleeves to metal pipes are toxic and accordingly pose considerable environmental problems. Moreover, the number of glues which can be used is limited by the fact that only a few glues withstand large temperature change stresses over a satisfactory period of time otherwise, premature aging will occur. However, premature aging will result in leaks, particularly in the cooling system of a motor vehicle engine. As a result, the connections between metal pipes and receiving sleeves will have to be changed repeatedly in the course of regular servicing during the normal lifetime of a motor vehicle.

SUMMARY OF THE INVENTION

Based on the prior art, the object of the present invention is to provide an arrangement for a tight connection of a metal pipe to a receiving sleeve which can be produced easily while avoiding environmental and disposal problems, has a long useful life and can also be readily exchanged subsequently with conventional arrangements.

In accordance with the present invention, the receiving sleeve has on an inner side thereof two diametrically oppositely located grooves which terminate at the end face of the receiving sleeve. The arrangement includes a plug-in sleeve of metal fastened on the metal pipe, wherein the plug-in sleeve is provided with radial projections for engagement in the grooves of the receiving sleeve. The receiving sleeve and the plug-in sleeve each have tangential slots for receiving a U-shaped clamp in order to couple the sleeves to each other detachably but rigidly with respect to pulling and pushing forces. The plug-in sleeve has a fixing portion with cylindrical inner and outer diameters, a cylindrical coupling portion having greater inner and outer diameters than the fixing portion, and a conically shaped transition portion with a uniform wall thickness, wherein the transition portion integrally connects the fixing portion and the coupling portion. The radial projections are substantially axially oriented tongues cut out of the coupling portion and extending at an angle relative to the coupling portion.

A plug-in sleeve made of metal which is placed on the end of a metal pipe. This plug-in sleeve is formed from a pipe portion by noncutting shaping. It is formed of three longitudinal portions, namely a cylindrical fixing portion, a cylindrical coupling portion and a conical transition portion between the fixing portion and the coupling portion.

The cylindrical fixing portion serves to fix the plug-in sleeve on the end of the pipe, while the coupling portion with tabs or tongues is used for detachably connecting the plug-in sleeve to the receiving sleeve. In so doing, the tongues engage in the diametrically opposite grooves when the plug-in sleeve is inserted into the receiving sleeve. The cooperation between the tongues and the grooves serves to prevent relative rotation. In order to prevent incorrect positioning, the grooves and the tongues have different widths and different depths on both circumferential portions of the coupling portion and receiving sleeve so that there is only one possible coupling position of the plug-in sleeve and receiving sleeve. An erroneous coupling is impossible.

Further, the outer surface of the fixing portion together with the outer surface of the conical transition portion and the inner surfaces of the receiving sleeve forms sealing surfaces for the contact of sealing elements and supporting elements. In particular, an O-shaped sealing ring and a trapezoidal supporting ring are used adjacent to one another for this purpose.

The plug-in sleeve is fixed in the receiving sleeve so as to be rigid with respect to pulling and pushing especially by means of a U-shaped clamp whose two legs penetrate tangential slots in the two sleeves. The U-shaped clamp is preferably designed so as to be resilient. It is made of metal.

An advantage of the invention consists in that a metallic plug-in sleeve can now be secured to a metal pipe. Accordingly, there are no longer different materials leading to disposal problems and/or recycling problems. All glues causing problems with respect to toxicity and drying times and curing times can also be dispensed with. Related problems with respect to the environment and useful life are accordingly also eliminated. There is no longer a risk of premature aging so that a long lifetime for the connection can be ensured even when it is frequently detached and reconnected.

The plug-in sleeve is secured in position in the receiving sleeve in an improved manner by means of a special design of the tongues.

In accordance with another feature, an insertion bevel is provided between the end face and the outer surface at the free end of the fixing portion which allows the plug-in sleeve and receiving sleeve to be joined in an oriented manner.

The fixing of the plug-in sleeve on the metal pipe can be effected in that the fixing portion is pressed on the outer surface of the metal pipe.

Instead of this pressing, or in addition to it, the plug-in sleeve can also be fixed on the metal pipe by welding. For example, capacitor-discharge welding is advantageous.

The plug-in sleeve can be fixed on the metal pipe in another way in that the fixing portion is connected with the metal pipe by soldering. The soldering can also be carried out in conjunction with a pressing connection of the fixing portion and metal pipe.

The preferred use of the connection arrangement according to the invention is in a cooling line for a motor vehicle, wherein the receiving sleeve which is made of plastic is secured to the free end of a hose made of plastic or rubber.

The invention is explained more fully in the following with reference to an embodiment example shown in the drawings.

DESCRIPTION OF THE PREFERRED EMBODIMENTS

Figure 1:
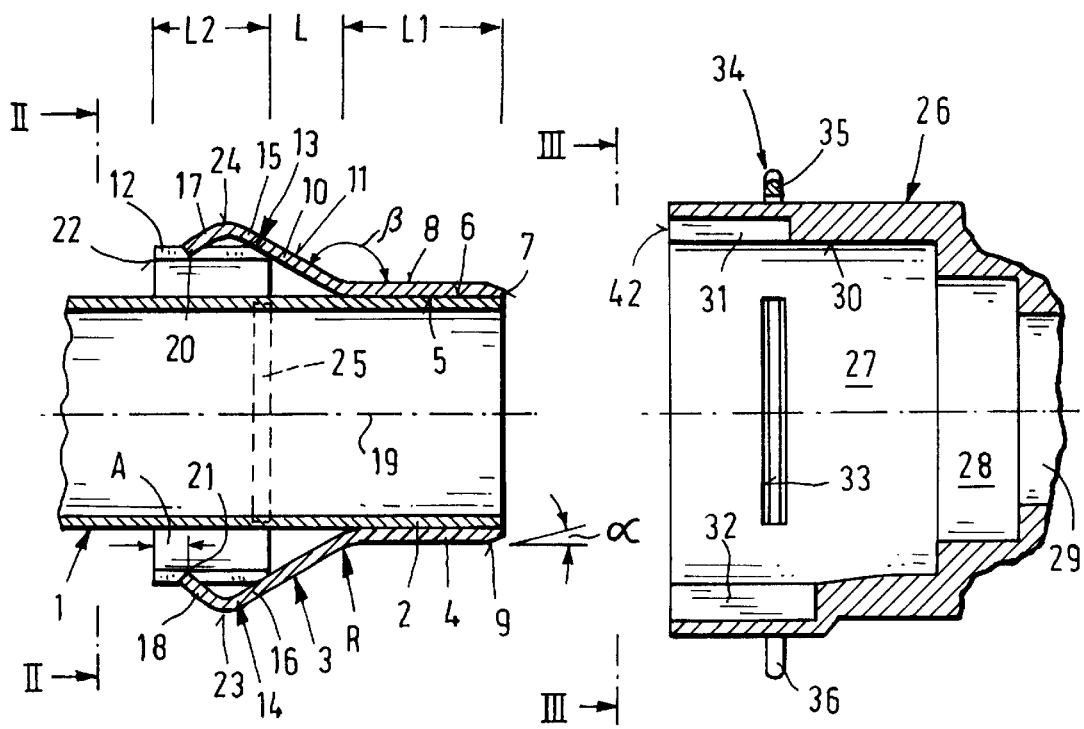
FIG. 1 a view in vertical longitudinal section showing an arrangement for the connection of a metal pipe to a receiving sleeve prior to coupling.
Figure 2:
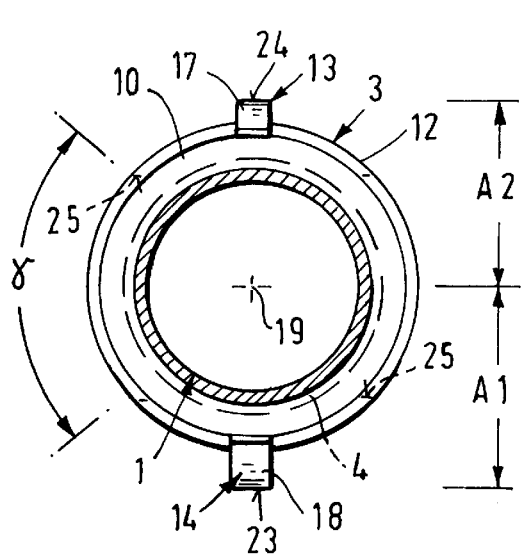
FIG. 2 shows a vertical cross section through the view along line II—II in FIG. 1.
Figure 4:
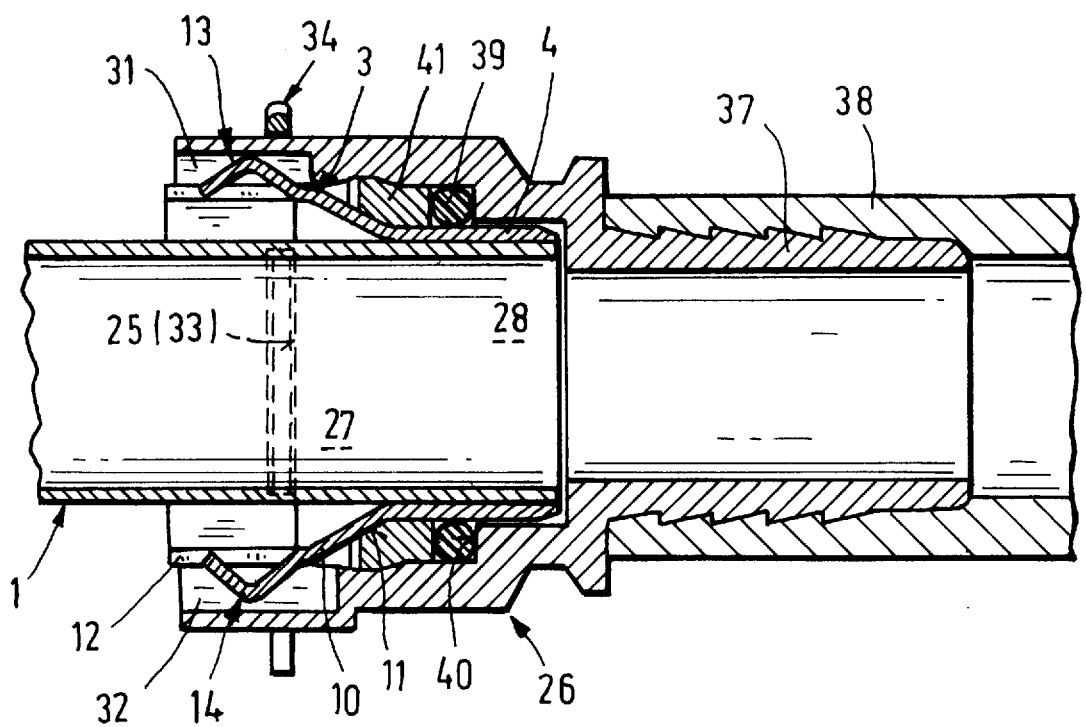
FIG. 4 is a view in vertical longitudinal section showing the arrangement shown in FIG. 1 in the coupled state.
Figure 5:
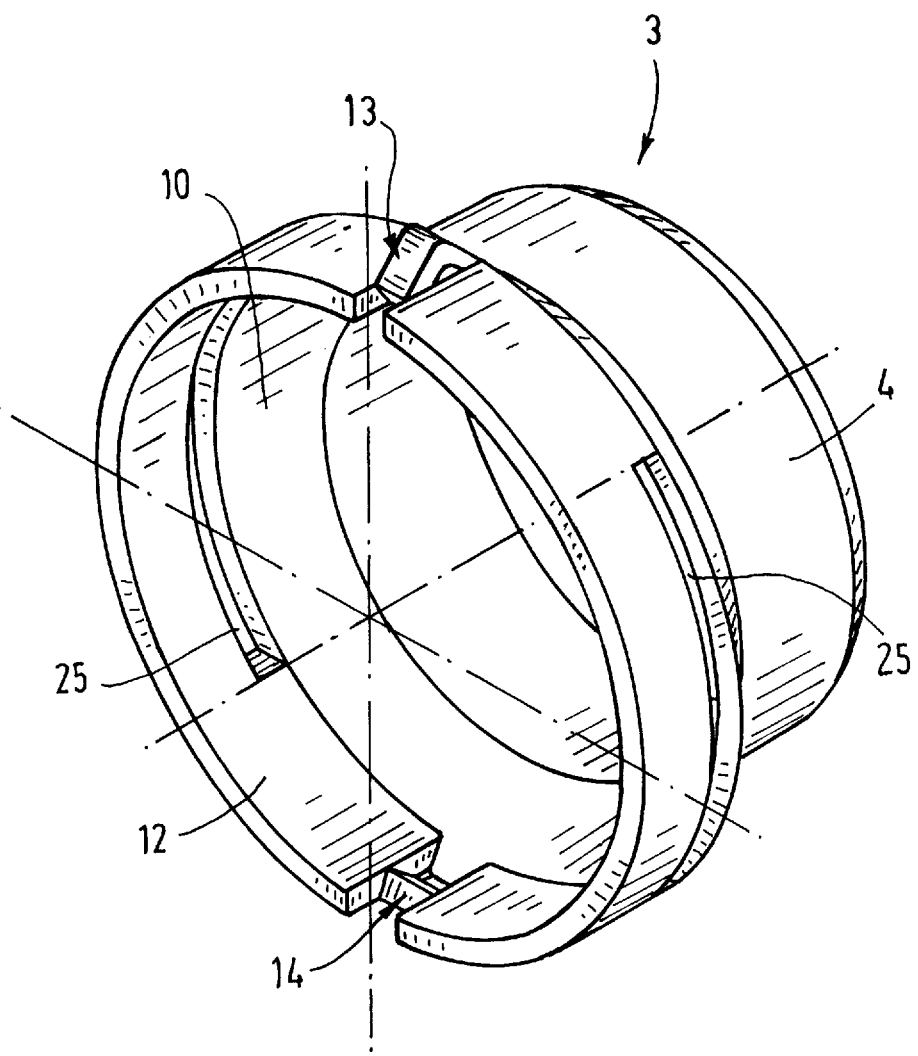
FIG. 5 is a perspective view, on a larger scale, showing a plug-in sleeve used in the connection arrangement of FIGS. 1–4.

In FIGS. 1, 2 and 4, a metal pipe such as that used in a cooling system for the engine of a motor vehicle is designated by 1. A metallic plug-in sleeve 3 is pressed on the end 2 of the metal pipe 1 (FIGS. 1 and 2). The plug-in sleeve 3 which is shaped from a pipe portion has a fixing portion 4 which is shaped cylindrically with reference to its inner and outer diameter, this fixing portion 4 being pressed on the outer surface 6 of the metal pipe 1 by its inner surface 5. An insertion bevel 9 is provided between the end face 7 of the fixing portion 4 and the outer surface 8. The angle α between the insertion bevel 9 and the outer surface 8 is 10°.

A conical transition portion 10 adjoins the fixing portion 4 at radius R. The angle β between the outer surface 8 of the fixing portion 4 and the outer surface 11 of the transition portion 10 is 150°. The axial length L of the transition portion 10 is shorter than the axial length L1 of the fixing portion 4.

The conical transition portion 10 passes into a coupling portion 12 which is likewise cylindrical with respect to its inner and outer diameter. The inner and outer diameter of the coupling portion 12 is greater than the respective inner and outer diameter of the fixing portion 4. The axial length L2 of the coupling portion 12 is also smaller than the axial length L1 of the fixing portion 4.

As will further be seen from consideration of FIGS. 1 and 2 in combination, tongues 13, 14 are cut out of the coupling portion 12 so as to be offset diametrically. These tongues 13, 14 are bent at an angle and have, in each instance, a leg 15, 16 which is aligned with the wall of the transition portion 10, while the other leg 17, 18 faces the common longitudinal axis 19 of the plug-in sleeve 3 and the metal pipe 1. The free ends 20, 21 of these legs 17, 18 end in the thickness region of the wall of the coupling portion 12 at a distance A from the end face 22 of the coupling portion 12.

FIG. 2 shows that the tongues 13, 14 have widths of different dimensions. The distance A1 from summit 23 of the wider tongue 14 to the plane intersecting the longitudinal axis 19 of the plug-in sleeve 3 and metal pipe 1 is greater than the distance A2 from the summit 24 of the narrower tongue 13 to the same plane.

Further, FIGS. 1 and 2 also show that the plug-in sleeve 3 is provided with two tangential slots 25 between the tongues 13, 14 roughly in the transverse plane intersecting the root region of the tongues 13, 14, The slots 25 extend through an opening angle γ of approximately 90°.

Figure 3:
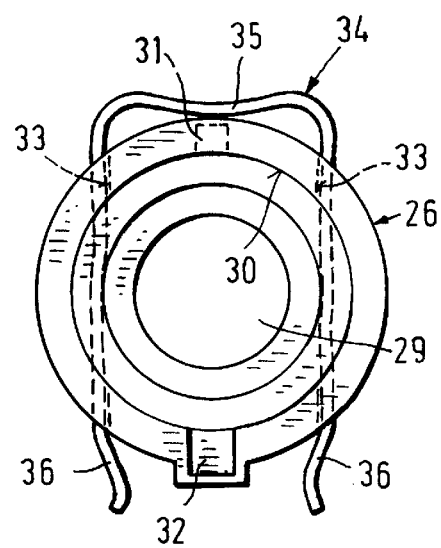
FIG. 3 hows a vertical cross section through the view along line III—III in FIG. 1.

It will be seen from FIGS. 1 and 3 that the complementary piece or counterpiece for the plug-in sleeve 3 forms a receiving sleeve 26 of plastic. The receiving sleeve 26 has a cylindrical coupling space 27 whose diameter is adapted to the outer diameter of the coupling portion 12. A cylindrical receiving space 28 of shorter length whose inner diameter is adapted to the outer diameter of the fixing portion 4 adjoins this coupling space 27. On the other hand, this receiving space 28 is connected with a bore hole 29 for conveying the medium in question.

Two grooves 31, 32 are worked into the surface 30 of the coupling space 27 so as to be offset diametrically, the depth and width of these grooves 31, 32 being adapted to the design of the tongues 13, 14; that is, groove 31 is adapted to tongue 13 and groove 32 is adapted to tongue 14. The grooves 31, 32 open into the end face 42 of the receiving sleeve 26.

Further, it will be seen that the receiving sleeve 26 is also provided with tangential slots 33 in the circumferential region between grooves 31, 32. These slots 33 extend approximately into the transverse plane intersecting the inner end of the smaller groove 31. The tangential slots 33 are used for the insertion of a U-shaped clamp 34 made of a resilient material with a web 35 and two adjoining spring legs 36.

For a tight coupling of the metal pipe 1 with the receiving sleeve 26, especially in the case illustrated in FIG. 4 in which the receiving sleeve 26 is provided with a circumferentially toothed connection piece 37, the end of a hose 38 of plastic or rubber being fastened to this connection piece 37, an O-ring 39 is first inserted in the receiving sleeve 26 as a sealing ring and is pushed up until reaching the shoulder 40 between the coupling space 27 and the receiving space 28. A trapezoidal supporting ring 41 is positioned adjacent to the sealing ring 39.

The metal pipe 1 with the plug-in sleeve 3 fastened thereto can now be slid into the receiving sleeve 26 until the outer face 11 of the conical transition portion 10 makes contact with the supporting ring 41 and the tangential slots 25 in the plug-in sleeve 3 correspond with the tangential slots 33 in the receiving sleeve 26. The U-shaped clamp 34 can now be inserted into the slots 25, 33 and the metal pipe 1 can in this way be coupled with the receiving sleeve 26 so as to be fixed with respect to pushing and pulling, but so as to be detachable.

In order to decouple the metal pipe 1 and receiving sleeve 26 it is only necessary to pull the clamp 34 transversely out of the slots 25, 33 and to pull the metal pipe 1 with the plug-in sleeve 3 out of the receiving sleeve 26.

I claim:

1. An arrangement for tightly connecting a metal pipe to a receiving sleeve, the receiving sleeve having on an inner side thereof two diametrically oppositely located grooves, the receiving sleeve having an end face, wherein the grooves terminate at the end face of the receiving sleeve, the arrangement comprising a plug-in sleeve of metal fastened on the metal pipe, the plug-in sleeve having radial projections adapted for engagement in the grooves of the receiving sleeve, the receiving sleeve and the plug-in sleeve each having tangential slots, further comprising a U-shaped clamp engaging in the tangential slots of the receiving sleeve and the plug-in sleeve for coupling the receiving sleeve and the plug-in sleeve with one another detachably but rigidly with respect to pulling and pushing forces, the plug-in sleeve comprising a cylindrical fixing portion having inner and outer diameters, a cylindrical coupling portion having greater inner and outer diameters than the fixing portion, and a conically-shaped transition portion having a uniform wall thickness, the transition portion integrally connecting the fixing portion and the coupling portion, the radial projections being substantially axially oriented tongues cut out of the coupling portion and extending at an angle relative to the coupling portion.

2. The arrangement according to claims 1, wherein each tongue is angle-shaped with first and second legs, wherein the first legs extends in alignment with the transition portion and the second leg is directed toward a longitudinal axis of the plug-in sleeve, and wherein a free end of the second leg ends at the coupling portion at a distance from an end face of the coupling portion.

3. The arrangement according to claim 1, wherein the fixing portion has an end face and an outer surface, the fixing portion having an insertion bevel extending between the end face and the outer surface.

4. The arrangement according to claim 1, wherein the fixing portion is pressed onto the metal pipe.

5. The arrangement according to claim 1, wherein the fixing portion is welded to the metal pipe.

6. The arrangement according to claim 1, wherein the fixing portion is soldered to the metal pipe.

7. The arrangement according to claim 1, wherein the metal pipe is a cooling pipe of a motor vehicle, and wherein the receiving sleeve is of synthetic material and is connected to a hose of synthetic material or rubber.

* * * * *